(12) United States Patent
Lee

(10) Patent No.: US 6,511,080 B2
(45) Date of Patent: Jan. 28, 2003

(54) FORK LIFT TROLLEY

(76) Inventor: Wen-Ching Lee, 2nd Fl., No. 20, Keh-Chiang Rd., 13 Lin, Lan-Hsing Li, Shih-Lin Dist., Taipei (TW)

( * ) Notice: Subject to any disclaimer, the term of this patent is extended or adjusted under 35 U.S.C. 154(b) by 7 days.

(21) Appl. No.: 09/783,780

(22) Filed: Feb. 14, 2001

(65) Prior Publication Data

US 2002/0109317 A1 Aug. 15, 2002

(51) Int. Cl.$^7$ ................................................ B62B 3/06
(52) U.S. Cl. .................................... 280/43.12; 414/495
(58) Field of Search ........................... 280/43.12, 47.34, 280/79.11, 79.3, 35, 638, 651, DIG. 11; 254/2 R, 2 C, 423, 93 VA; 414/495, 685, 663, 630, 631, 785

(56) References Cited

U.S. PATENT DOCUMENTS

| | | | |
|---|---|---|---|
| 3,843,147 A | * 10/1974 | Fredericson | 280/43.12 |
| 4,366,883 A | * 1/1983 | Reeves | 414/631 |
| 4,655,466 A | * 4/1987 | Hanaoka | 280/47.34 |
| 4,921,385 A | * 5/1990 | Okuno | 414/495 |
| 4,969,794 A | * 11/1990 | Larsen | 414/495 |
| 5,403,024 A | * 4/1995 | Frketic | 280/43.12 |
| 5,454,625 A | * 10/1995 | Christensen et al. | 414/495 |
| 5,505,578 A | * 4/1996 | Fuller | 254/2 R |
| 5,516,128 A | * 5/1996 | Nakade et al. | 280/43.12 |
| 5,819,338 A | * 10/1998 | Hession | 414/495 |
| 5,829,948 A | * 11/1998 | Becklund | 414/785 |
| 6,024,528 A | * 2/2000 | Taylor | 414/495 |

FOREIGN PATENT DOCUMENTS

| | | | | |
|---|---|---|---|---|
| CH | 679929 | * | 5/1992 | 280/43.12 |
| FR | 2652071 | * | 3/1991 | 280/43.12 |
| JP | 1-226473 | * | 9/1989 | 414/495 |

* cited by examiner

*Primary Examiner*—Frank Vanaman
(74) *Attorney, Agent, or Firm*—Kolisch Hartwell, P.C.

(57) ABSTRACT

A fork lift trolley includes a frame with two L-shaped members, a pair of forks mounted on the members to rise and descend thereon, a hydraulic mechanism fitted to a front of the frame, a pair of closely-spaced pivot wheels formed at a bottom of the hydraulic mechanism, and a steering handle linked to the pivot wheels. A hoist mechanism is fitted to the frame and connected to the hydraulic mechanism. The hoist mechanism is actuated by a hydraulic pump fitted below the steering handle which is pivotally raised and lowered to actuate the hydraulic pump. The handle has a heart shaped grip at a top thereof which is easily grasped by one hand of an operator, and a pressure-release trigger is mounted in the steering handle and within the grip, whereby the operator can de-actuate the hoist mechanism with the same hand holding the grip.

10 Claims, 7 Drawing Sheets

FORK LIFT TROLLEY

BACKGROUND OF THE INVENTION

1. Field of the Invention

The present invention relates to a fork lift trolley, and more particularly an easily-maneuvered fork lift truck with closely-combined steering wheels, a conveniently disposed hoist device, and a track system for ensuring secure raising and lowering of a pair of forks.

2. Description of Related Art

In many industrial applications, there is a need for a small and relatively inexpensive fork lift trolley with which loads can be easily transported by workers without the need for expensive fork lift trucks which can only be driven by qualified staff. By use of such a trolley, heavy loads can be moved around even confined areas, and the trolley is always available for use as it does not have the batteries of a fork lift truck which need a considerable recharging time.

FIG. 7 shows a prior art fork lift trolley comprising a fixed frame (60) with two spaced-apart L-shaped members (64) with a pair of pivot wheels (62) disposed at a front end thereof, a hoist mechanism (70) fitted near to the front of the fixed frame (60), a handlebar (63) fitted to a top of each L-shaped member (64), and a pair of forks (75) fitted to the fixed frame (60) by a pair of X-shaped braces (65) and raised and lowered relative to the fixed frame (60) by actuation of the hoist mechanism (70). The hoist mechanism (70) consists of hydraulic device (72) fitted to the front of the fixed frame (60) and between the forks (75) and the pivot wheels (62), a pair of chains (73) each with a first end secured to the forks (75) and a second end secured to a top end of the fixed frame (60), a foot pump (78) secured to the bottom front end of the fixed frame (60), and a pressure release handle (79). To raise the forks (75), an operator grasps the handlebar (63) with two hands to steady the trolley and then steps on the foot pump (78) whereby pressurized oil is fed to the hydraulic device (72) whereby a piston (71) rises therefrom to urge upward a pulley (74) around which the chains (73) are reeved, such that the forks (75) are pulled up. The operator pulls the pressure release handle (79) to release the pressurized oil whereby the piston descends, and accordingly the pulley (74) and forks (75) descend. The X-shaped braces (65) each have a lower first end pivotally secured to the front of the fixed frame (60), an upper first end pivotally secured to a front end of the respective fork (75), a lower second end slidingly received in a bottom bar of each L-shaped member (64), and an upper second end slidingly received in an underside of the respective fork (75). The braces (65) provide support to the forks (75) as they rise and fall. Distal end of the lower bars of the L-shaped members (64) each house a non-steering wheel (66). When the trolley is maneuvered, the operator grasps with two hands the handle (63) and steers the trolley by the pivot wheels (62). However, the following drawbacks are found with the cited prior art trolley:

(i) the widely-spaced pivot wheels mean that turning axes of the front end are too far apart, and it is difficult to accurately maneuver the trolley.

(ii) The location of the hydraulic device is too far away from the axes of the pivot wheels, whereby a turning circle of the pivot wheels relative to the center line of the piston limits maneuverability of the trolley.

(iii) The pivot wheels can pivot independently of each other which leads to wheel wobble and difficulty in controlling the direction of the trolley during movement, leading to a danger of collision.

(iv) The pressure release handle is separate to the handlebar and so an operator has to let go of the handlebar with one hand to operate the pressure release handle which is inconvenient and contrary to good ergonomic principles.

(v) The pulley and chains do not have good sliding support and slack occurs between the forks and the fixed frame which leads to wobble as the forks rise and fall whereby loose articles being transported may drop and cause injury, damage, etc.

SUMMARY OF THE INVENTION

The object of the present invention is to provide a fork lift trolley with two closely-spaced pivot wheels to enable travelling direction of the trolley to be controlled well by an operator.

Another object of the present invention is to provide a fork lift trolley with a hydraulic mechanism with a longitudinal center line close to axes of the pivot wheels, whereby the trolley has a good turning circle.

Yet another object of the present invention is to provide a fork lift trolley with a sliding track system to securely control raising and lowering of a ram of the fork lift trolley.

Yet another object of the present invention is to provide a fork lift trolley with a pressure release trigger sited ergonomically within a handle of the trolley.

The fork lift trolley includes a frame with two L-shaped members which are spaced apart, a handle pivoted in two planes to the frame, a pair of closely-spaced and linked pivot wheels, a hydraulic mechanism fitted above the pivot wheels and between the handle and the frame, a hydraulic pump actuable by movement of the handle, a pair of forks connected to the frame and supported by a pair of X-shaped braces mounted on lower bars of the L-shaped members, and a hoist mechanism with two chains connected to the frame and a track system in the forks.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
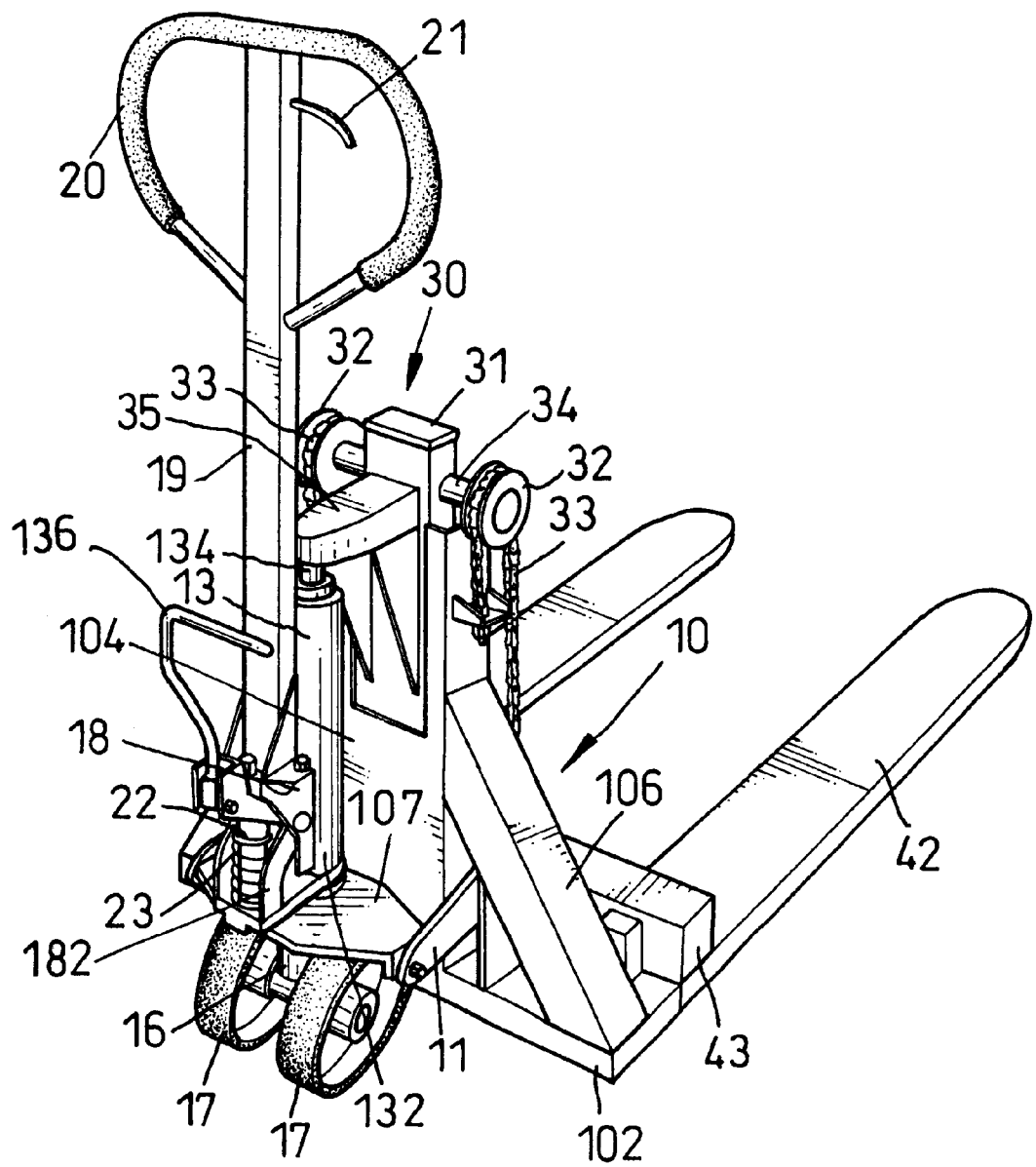
FIG. 1 is a perspective view of a fork lift trolley in accordance with the present invention.
Figure 3:
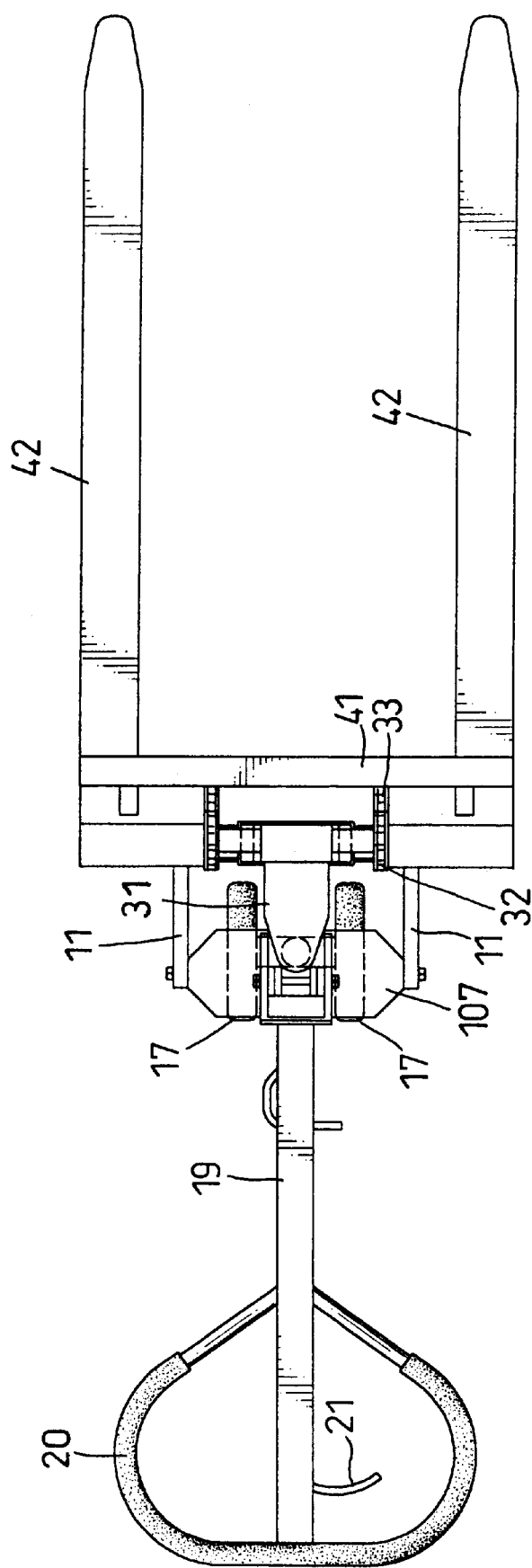
FIG. 3 is a top view of the fork lift trolley shown in FIG. 1, with a steering handle in a first position.
Figure 6:
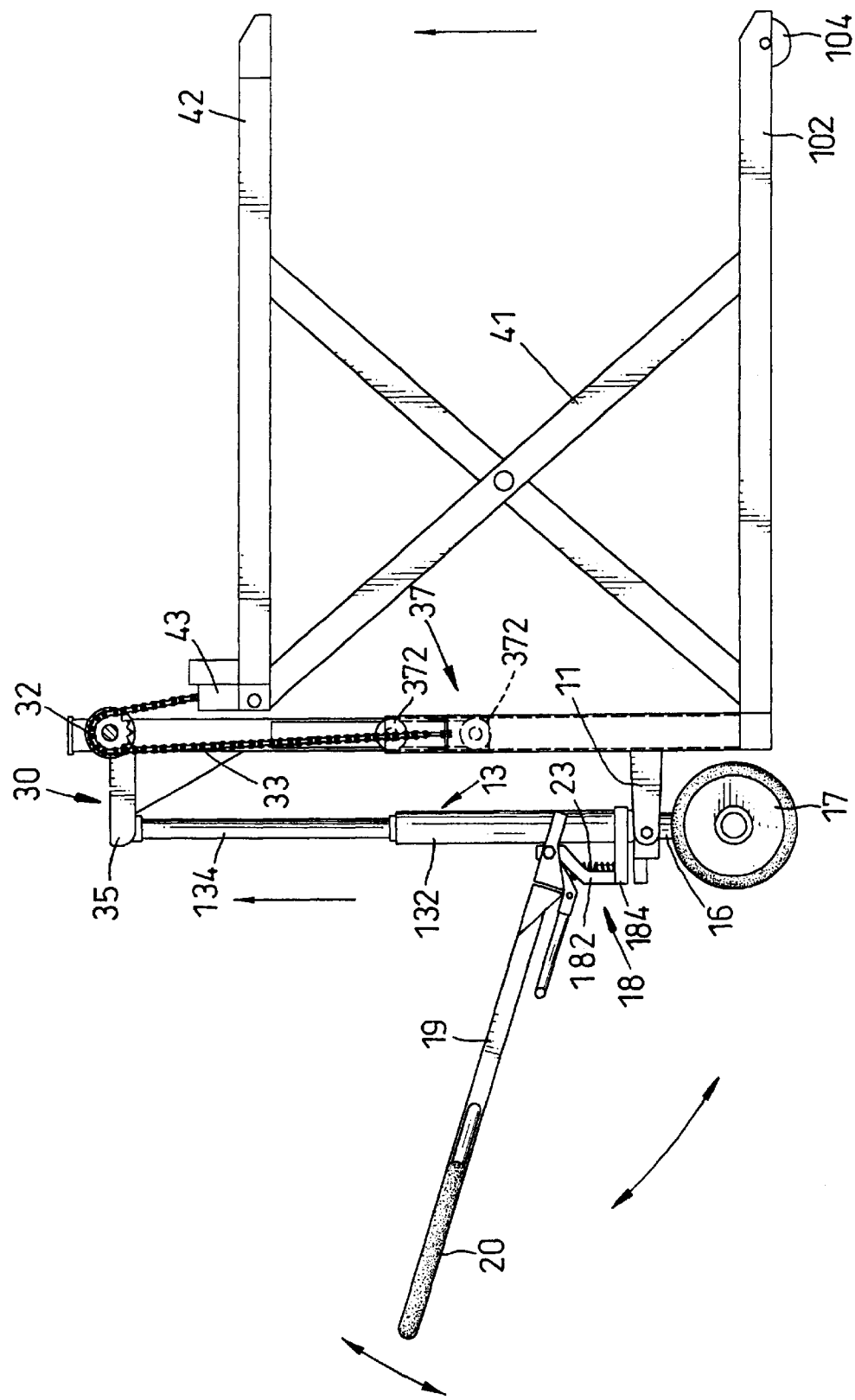
FIG. 6 is a side view of the fork lift trolley shown in FIG. 1, in a raised mode.
Figure 7:
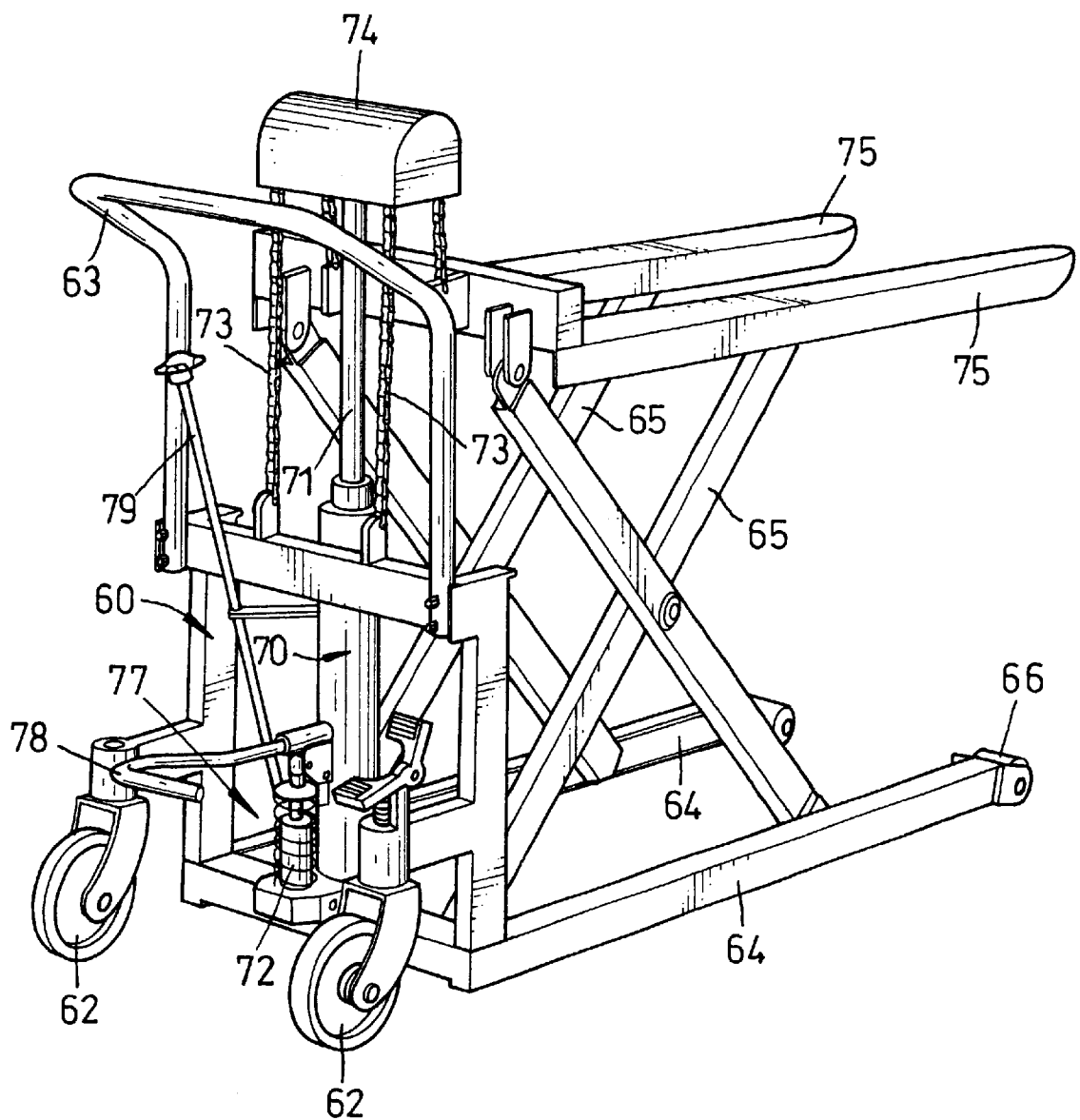
FIG. 7 is perspective view of a prior art fork lift trolley.

Referring to the figures and especially FIGS. 1 and 3, a fork lift trolley in accordance with the present invention includes a frame (10) with two L-shaped members (102)

which are spaced-apart, a handle (19) pivoted in two planes to the frame (10), a pair of closely spaced and linked together pivot wheels (17), a hydraulic mechanism (13) fitted above the pivot wheels (17) and between the handle (19) and the frame (10), a hydraulic pump (23) actuable by movement of the handle (19), a pair of forks (42) connected to the frame (10) and supported by a pair of X-shaped braces (41) mounted on a respective lower bar of the L-shaped members (102) as shown in FIG. 6, and a hoist mechanism (30) with two chains (33) connected to the frame (10).

Still referring to FIGS. 1 and 3, the L-shaped members (102) are joined by a central column (104) which is hollow and includes two opposed inner side walls. Furthermore, two inclined supports (106) extend between distal side edges of the lower bars of the members (102) and the central column (104). A distal end of each lower bar of the members (102) houses a support wheel (105). A lateral plate (107) extends from near a front face of the central column (104) and at a bottom thereof. Two side plates (11) secure the lateral plate (107) to the frame (10). A bracket (18) comprises two spaced-apart walls (182) extending from a base plate (184) and is secured at the base plate (184) to the cylinder (132) and just above the lateral plate (107). A bottom portion of the steering handle (19) is pivotally secured to top edges of the walls (182) of the bracket (18). A top portion of the steering handle (19) is formed with a substantially heart-shaped grip (20). A pressure release trigger (21) is fitted in the handle (19) and within the grip (20). The hydraulic pump (23) is mounted on the lateral plate (107) and between the walls (182) of the bracket (18), and below the bottom tip of the handle (19). A compression spring (22) is disposed around and protrudes from a top end of the hydraulic pump (23), to abut the bottom tip of the handle (19).

Referring to FIGS. 1 and 3, the forks (42) are joined together at front ends thereof by a cross-bar (43).

Referring to FIG. 1, the pivot wheels (17) are secured to each other and indirectly to the handle (19) by a union (16) which is shaped as an inverted "T" with an upright bar and a transverse bar. The pivot wheels (17) are respectively mounted to distal ends of the transverse bar of the union (16). The upright bar of the union (16) extends up through the lateral plate (107) to fixedly engage with a bottom end of the cylinder (132).

Figure 2:
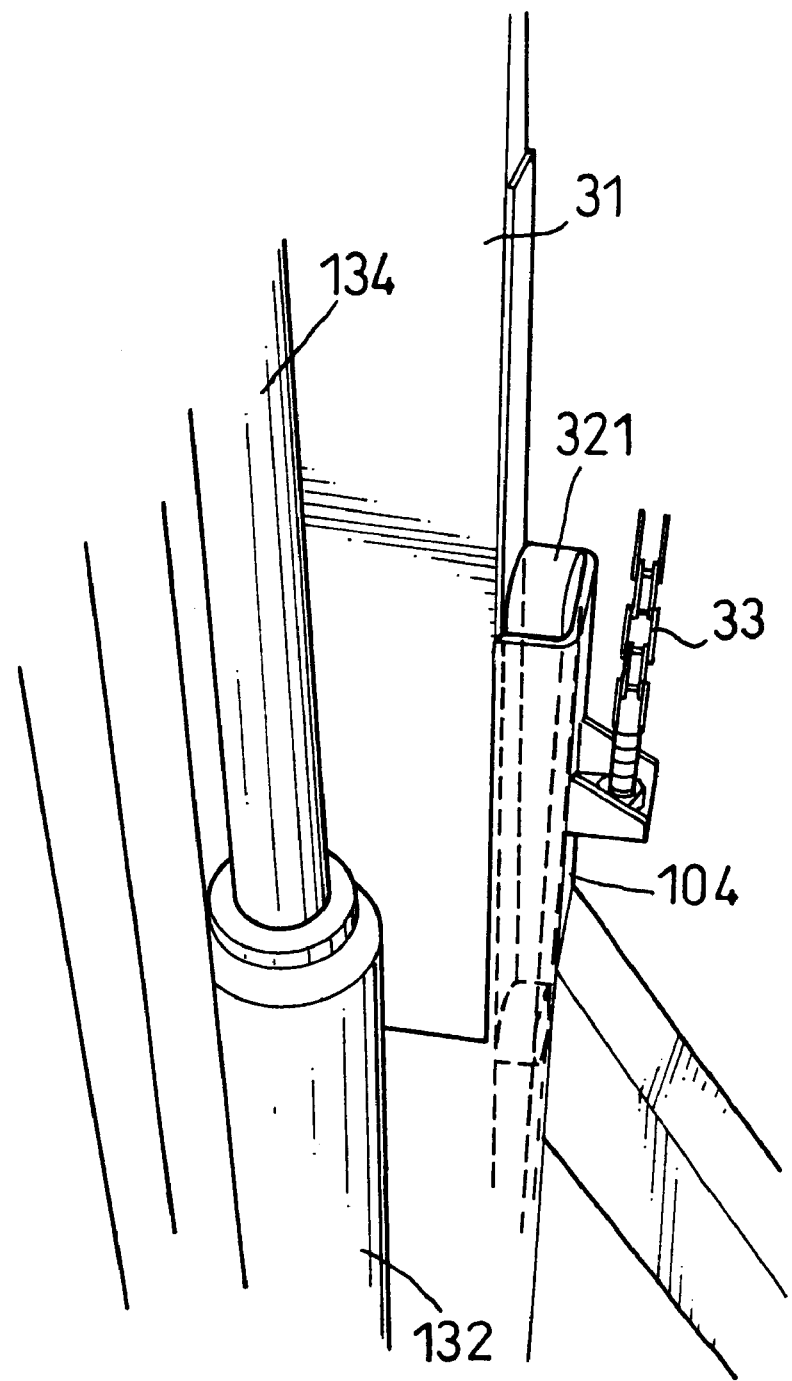
FIG. 2 is a detailed view of a hoist mechanism of the fork lift trolley of FIG. 1.

Referring to FIGS. 1, 2 and 3, the hoist mechanism (30) has a ram (31) slidingly received in an interior of the central column (104), and includes an arm (35) extending from a front face of the ram (31) and near a top end thereof. Two sprockets (32) are attached to distal ends of an axle (34) received in the top end of the ram (31). The two chains (33) are respectively reeved around the sprockets (32), and have a first end secured to outer faces of the central column (104). A second end of each chain (33) is secured to the cross-bar (43). The sliding track system (37) comprises two pairs of spaced-apart rollers (372) sandwiched between the respective inner side walls of the central column (104) and the ram (31).

Referring to FIGS. 1 and 2, the hydraulic mechanism (13) includes a cylinder (132) with a piston (134) slidingly received in the cylinder (132). A distal tip of the piston (134) is secured to an under face of the arm (35) of the hoist mechanism (30). A first pipe (not shown nor numbered) communicates the hydraulic pump (23) with the piston (134) and the cylinder (132) to actuate the hydraulic mechanism (13). A second pipe communicates the trigger (21) with the cylinder (132) and the piston (134) to de-actuate the hydraulic mechanism (13). As connections between the first and second pipes are commonly-known to those in this field and do not form part of the claimed invention, further description thereof is omitted. A foot lever (136) is pivotally mounted to the hydraulic mechanism (13) and linked to the hydraulic pump (23) for actuation thereof.

Figure 4:
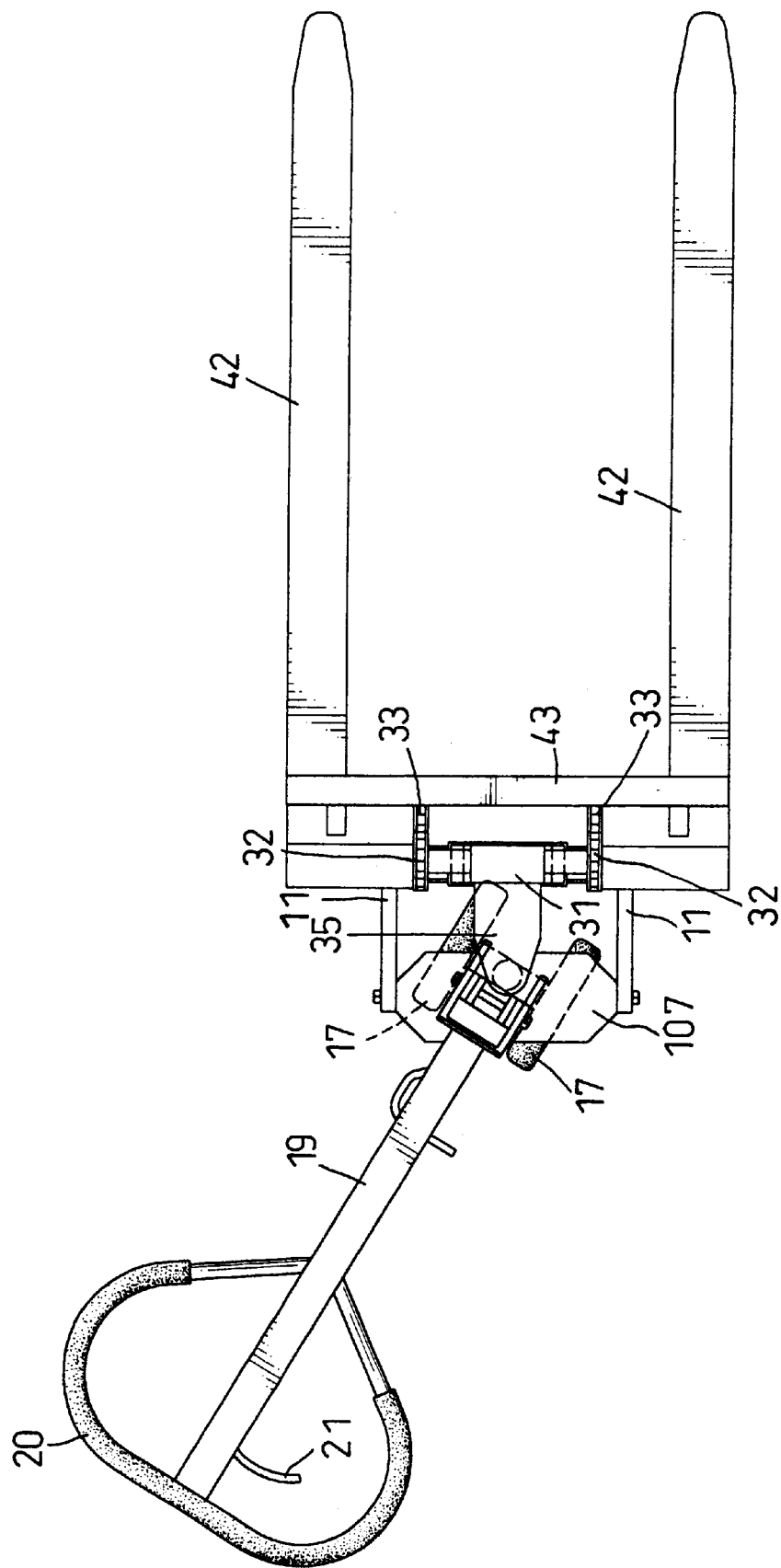
FIG. 4 is a top view of the fork lift trolley shown in FIG. 1, with the steering handle in a second position.

In operation, referring to FIGS. 3, and 4, the steering handle (19) is easily swung from side to side to steer the trolley due to the close spacing of the pivot wheels (17). Furthermore, the common longitudinal axis of the union (16) and the hydraulic mechanism (13) ensures good support of the hoist mechanism (30).

Figure 5:
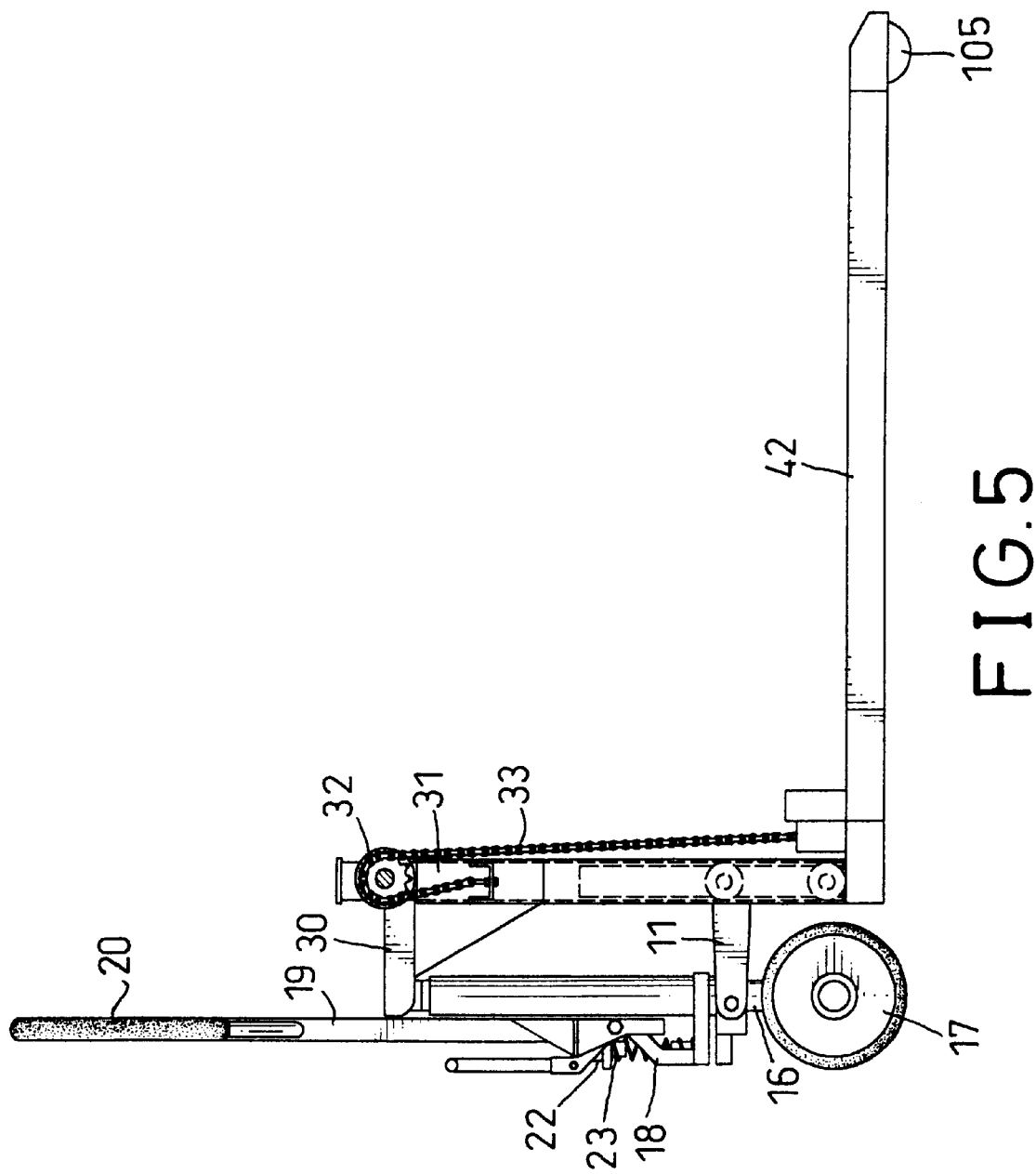
FIG. 5 is a side view of the fork lift trolley shown in FIG. 1, in a lowered mode.

In reference to FIG. 5, the trolley is shown in a lowered status with the forks (42) resting on the lower bars of the members (102). In reference to FIG. 6, the steering handle is shown being pivoted up and down by the arrows, whereby the hydraulic pump (23) is actuated and pressurized fluid is transmitted to the hydraulic mechanism (13) via the first pipe, and thus the piston (134) rises to urge upward the hoist mechanism (30), and accordingly the forks (42). Alternatively, an operator can operate the foot lever (136) with one foot to actuate the hydraulic pump (23). The compression spring (22) provides a return force for the handle (19) and the foot lever (136).

The fork lift trolley of the present invention has the following advantages:

(i) ease of maneuverability. The closeness of the pivot wheels to each other provides excellent steering ability of the trolley. Furthermore, the union ensures that the pivot wheels turn together in harmony without shudder.

(ii) ease of actuation. The siting of the pressure release trigger within the grip provides excellent ergonomic one-handed operation.

(iii) stability. The track system ensures that the ram slides smoothly and securely in the central column to provide stability during the raising and lowering of the forks.

Although the present invention has been explained in relation to its preferred embodiment, it is to be understood that many other possible modifications and variations can be made without departing from the spirit and scope of the invention as hereinafter claimed.

What is claimed is:

1. A fork lift trolley, comprising:

a frame with a pair of closely spaced pivot wheels with a union therebetween and attached to a front of the frame via a lateral plate, and a pair of support wheels attached to a rear of the frame;

a handle to steer the pivot wheels being pivotal relative in two planes to the frame and attached to a bracket disposed above the lateral plate, and including a pressure release trigger sited at a top end of the handle;

a pair of X-shaped braces slidingly mounted on the frame;

a pair of forks respectively mounted on the pair of X-shaped braces;

a hoist mechanism mounted to the frame and connecting the frame and the forks;

a hydraulic pump with a return device being fitted to the bracket and abutting a bottom of the handle and actuable by at least downward pivoting of the handle;

a hydraulic mechanism mounted to the bracket and connected to the union of the pivot wheels, such that the hydraulic mechanism is operable by the hydraulic pump to raise and lower the pair of forks; and a track device slidingly mounted between the frame and the hoist mechanism to guide movement between the hoist mechanism and the frame, whereby the fork lift trolley is easily maneuvered due to the close spacing of the pivot wheels and due to a longitudinal axis of the pivot wheels being close to a longitudinal axis of the hydraulic mechanism, the fork lift trolley is securely operable due to the track device between the hoist mechanism and the frame, and the hydraulic mechanism is easily de-activated by the pressure release trigger being conveniently sited on the handle.

2. The fork lift trolley as claimed in claim 1, wherein the handle further comprises a substantially heart-shaped grip formed at the top end thereof and surrounding the pressure release trigger.

3. The fork lift trolley as claimed in claim 1, wherein the frame comprises two L-shaped members joined by a hollow central column, and the lateral plate is joined to the hollow central column by two side plates, wherein the union of the pivot wheels extends through the lateral plate and connects with a bottom end of the hydraulic mechanism.

4. The fork lift trolley as claimed in claim 3, wherein the hydraulic mechanism comprises a cylinder hydraulically connected with the pump mechanism and having a bottom end connected to the union of the pivot wheels, and a piston slidingly received and extendable from a top of the cylinder and having a distal tip connected to the hoist mechanism, whereby actuation of the pump mechanism causes the piston to rise and fall in the cylinder, thereby raising and lowering the hoist mechanism.

5. The fork lift trolley as claimed in claim 4, wherein the hoist mechanism has a ram slidingly received in the central column, and an arm extending from a top portion of the ram and connected with the distal tip of the piston.

6. The fork lift trolley as claimed in claim 5, wherein the hoist mechanism further comprises two sprockets rotatably connected to the top portion of the ram, each sprocket having a chain reeved therearound, and each chain having a first end secured to the frame and a second end secured to a respective one of the forks.

7. The fork lift trolley as claimed in claim 1, wherein the pump mechanism is further operable by a foot lever connected to the bracket.

8. The fork lift trolley as claimed in claim 1, wherein the return device of the hydraulic pump is a compression spring mounted around the hydraulic pump.

9. The fork lift trolley as claimed in claim 5, wherein the sliding track system comprises two pairs of rollers slidingly sandwiched between opposed inner faces of the ram and the central column.

10. The fork lift trolley as claimed in claim 3, wherein the frame further includes two inclined supports extending between opposed sides of the central column and a base of each L-shaped member.

* * * * *